Figure 5:
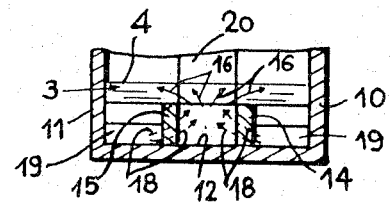

April 25, 1967 E. BRICHARD ET AL 3,316,078
METHOD AND TANK FURNACE FOR GLASS MAKING
Filed Sept. 18, 1963 2 Sheets-Sheet 1
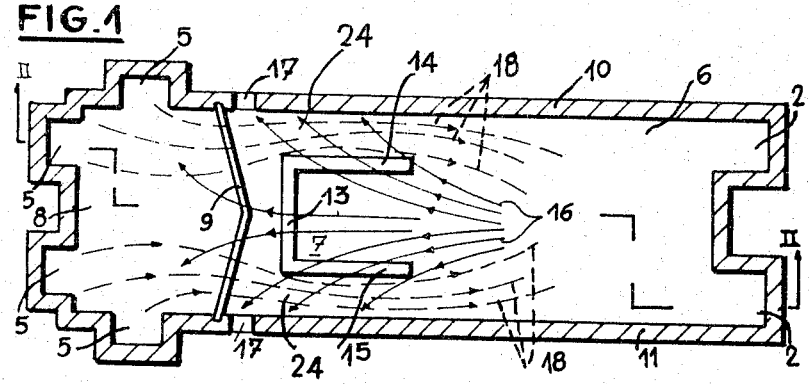
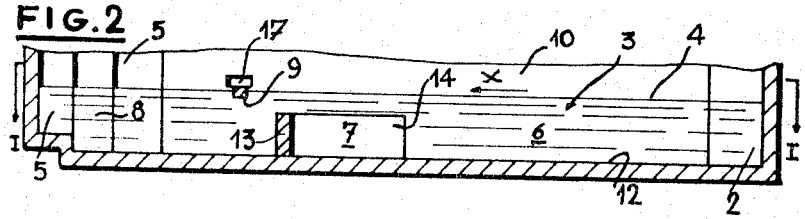
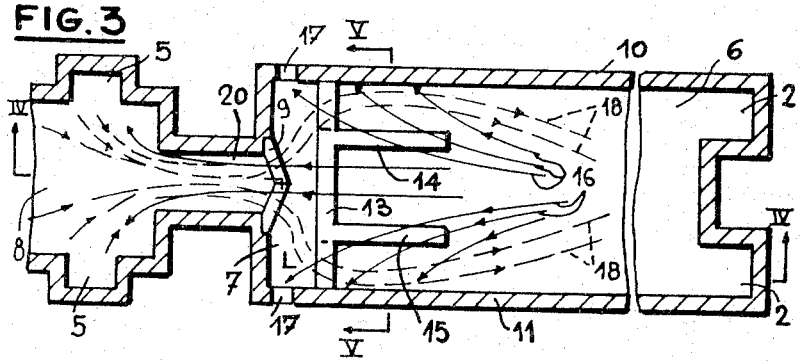
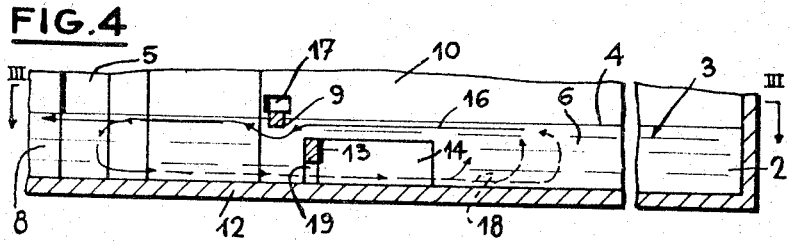

United States Patent Office 3,316,078
Patented Apr. 25, 1967

3,316,078
METHOD AND TANK FURNACE FOR GLASS MAKING
Edgard Brichard, Jumet, Michel Lambert, Charleroi, and André Malicheff, Liessewege, Belgium, assignors to Glaverbel, Brussels, Belgium
Filed Sept. 18, 1963, Ser. No. 309,684
Claims priority, application Luxembourg, Sept. 20, 1962, 42,388
10 Claims. (Cl. 65—134)

This invention relates to methods and apparatus for creating desirable currents in a glass bath in a glass melting tank. More particularly, the invention relates to a method and a device for deflecting towards at least one of the side walls of a glass melting tank the silica-rich melt residues which cover the central zone of the glass bath while the glass cooled in the working zone returns in counter-current towards the charging zone. The term "side walls" is used herein to describe the walls connecting the tank charging zone at one end of the tank with the zone at the other end of the tank where the glass cools and is removed.

It is well known that the foam layer at the end of the melt in the glass melting tanks is often covered by a film of silica-rich melt residues which are digested with difficulty by the homogeneous glass and appear in the finished products in the form of heterogeneities, causing optical faults or even deformations of the finished products, Such heterogeneities are particularly harmful to quality products such as sheet and polished plate glass.

It is also known that diverging surface currents become set up in glass melting tanks and such currents have the effect of entraining some of the film, which is seldom continuous and may even take the form of isolated patches. The impurities are therefore collected to some extent along the tank walls.

The diverging movement of the currents is more particularly emphasized by the presence of floaters which arrest the longitudinal movement of the upper surface of the glass bath. Frequently, however, the siliceous foam accumulates and becomes concentrated in front of the floaters and forms a film, some of which passes under the floaters and moves towards the removal zone of the melting tank.

Conventionally, the film is removed by skimming through tank sight-holes, but the central zone of the glass bath is generally inaccessible, particularly in large tanks. It is therefore of considerable importance and it constitutes a main object of the invention to spread out the surface currents between the melting zone and the working zone in order to convey the residues to the side walls of the tank for removal of said residues before they reach the end zone of the tank. A number of known devices tend to increase the flow of the surface currents from the central zone of the glass bath towards the side walls by the expedient of increasing the transverse temperature gradient between the longitudinal axis of the tank and the side walls in the vicinity where the residue is formed on the bath.

This effect can be produced in various ways, more particularly by the slowing down of the lighting of the burner flames when transverse burners are used, or else by the injections of a fluid or an extra quantity of fuel or heat along the tank axis.

Although these various expedients produce certain improvements, they are of low efficiency.

The present invention obviates the aforementioned disadvantages and produces other advantages which will be described hereinbelow.

According to the invention, the melt residues covering the central zone of the glass bath are deflected towards at least one side wall of a glass melting tank by cooled glass coming from the working zone downstream in the tank and which is guided to at least one of the side zones of the melting tank.

The glass brought by the return currents from the cooled working zone to the hot melting and refining zones is a main consumer of heat and exerts a cooling action on the surface current. Such action is not always equally distributed over the tank cross-section.

The distribution of the temperatures in the glass across the tank can be controlled very efficiently if the return currents are guided through specific zones. It is desirable to guide the currents towards at least one of the side walls to intensify the cooling thereof.

The deflection of the lower current of cooled glass towards only one of the side walls is applicable in tanks of asymmetrical shape in which the surface impurities to be skimmed off must all be concentrated on one side of the tank.

When the tank is symmetrical the lower current of cooled glass coming from the working zone is divided into partial currents which are respectively guided towards the two side zones of the tank. By the deflection of the return current of cooled glass towards the side walls less heat is removed from the surface glass flowing towards the working zone in the central zone of the tank, and more heat is removed from the surface glass moving along the side walls. Tests have shown that from the above arrangement the component of the surface currents perpendicular to the tank axis is considerably increased relative to the axial component, and in these conditions the melt residues accumulate along the side walls and can easily be skimmed off by conventional methods.

In an advantageous variant of the method, after the lower cooled glass has been deflected towards at least one of the side walls it is guided along such wall while returning towards the charging zone. The cooled glass which has been brought near the side wall is so constrained to move along such wall during a part of its return journey towards the charging end of the tank.

Preferably, the lower cooled glass is guided along the side wall to which it has been deflected until the lower cooled glass has at least entered the melting zone. The action of the current of the lower cooled glass circulating along the side walls is more vigorous the longer the distance which such currents are guided.

Preferably, a zone of glass close to the center of the tank is isolated from the currents of lower cooled glass. By the fact that the lower cooled glass is forced to rise to the bath surface before moving once again towards the working zone, such glass is prevented from extracting heat from the part of the surface glass metal which is moving towards the working zone in the central part of the tank.

The invention also relates to a glass melting tank for carrying out the method according to the invention, such melting tank comprising a wall rising from the tank bottom and extending transversely to the side walls, such wall being interrupted close to at least one of the side walls by leaving between itself and the said side wall a passage for the return of the lower cooled glass towards the charging zone.

A tank melting according to the invention is advantageous in all instances, but more particularly in cases where the tank is wide and comprises a narrowed portion joining the melting zone to the working zone. This is so because a tank of this kind concentrates the lower cooled glass coming from the working zone at the axis of the melting zone, and the resultant local heat extraction frequently lowers the temperature of the glass in such axial zone below the temperature of the two longitudinal areas intermediate the side walls. The result is that instead of creating surface currents which diverge towards the side walls, currents are produced which converge towards the tank axis and concentrate the siliceous foam thereat. Glass taken at the axis of the tank at the working zone is therefore usually contaminated by the heterogeneities which would lower the quality of the articles produced.

Advantageously, the wall rising from the tank bottom is submerged. Such a disposition prevents the tank atmosphere and more particularly the flames from attacking the immersed wall, while the residues continue to be guided towards the side walls as described hereinbefore.

Advantageously, such transverse wall is located at a longitudinal location in said tank substantially between the working zone and the melting zone. Such a location allows the currents of cooled glass to be guided before they enter the melting zone and thereby produce the advantageous effects described hereinbefore.

Preferably, the transverse wall has opposite ends each spaced from the tank side walls. The spacing of the ends of the transverse wall from the side walls generally allows a rational return of the lower cooled current. Alternatively, the transverse wall extends as far as the tank side walls and is open near the base of the tank adjacent said side walls to define passages for the currents of cooled glass.

Still further when the ends of the transverse wall are spaced from the tank side walls it is desirable to provide a submerged wing on the tank bottom extending from the transverse wall in a longitudinal direction towards the charging zone. The wing forms with the side wall and the tank bottom a channel for guiding the lower cooled glass towards the charging zone. Advantageously, the submerged wing extends into the melting zone, so that the lower cooled glass is guided as far as such zone. Preferably, two submerged wings are provided, one at each end of the transverse wall and they are joined to one another by a second submerged wall extending from the tank bottom parallel with the first mentioned transverse wall and located closer to the charging zone.

The result is the formation on the tank bottom of a closed quadrilaterial to which the lower cooled glass returning from the working zone has no access and therefore no heat can be extrated from the glass floating over such quadrilateral by the lower and cooler glass. The temperature of the glass in the central area above the quadrilateral is thus considerably greater relative to the surface glass located above the channels in which are conveyed the cooled glass from the working zone. The fact that the surface glass in the central area is at a temperature considerably higher than the glass in the side zones ensures that the currents of surface glass have a maximum transverse component and thereby flow towards the side walls of the tank.

Advantageously, the submerged wall connecting the ends of the submerged wings is located in the charging zone. The whole central area of the tank except for the charging pocket is therefore protected against being cooled by currents of lower cooled glass.

Figure 6:
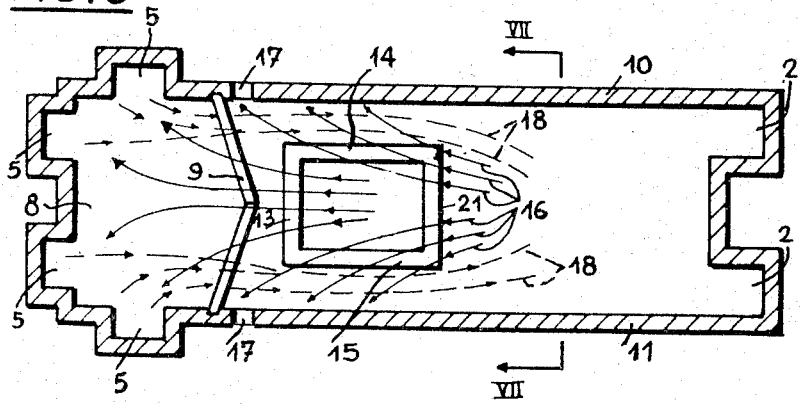
Figure 6A:
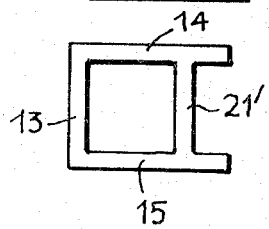
Figure 7:
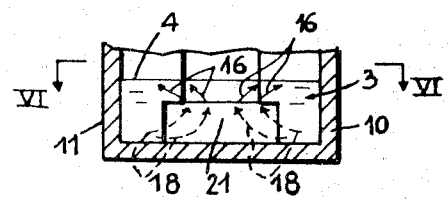
Figure 8:
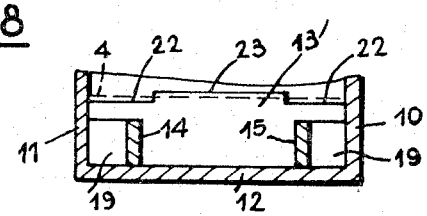

Specific embodiments of the invention will now be described by way of example with reference to the accompanying drawing in which:

FIGURE 1 is a sectional view taken along the line I—I in FIGURE 2 through a melting tank in a first embodiment of the invention, FIGURE 2 is a vertical section taken along the line II—II in FIGURE 1, the height being considerably exaggerated in relation to the length to make the drawing clearer, FIGURE 3 is a horizontal section taken along the line III—III in FIGURE 4 through a tank in a second embodiment of the invention, such tank having a narrowed portion between the refining zone and the working zone, FIGURE 4 is a vertical section similar to that in FIGURE 2, taken along the line IV—IV in FIGURE 3, FIGURE 5 is a sectional view taken along the line V—V in FIGURE 3, FIGURE 6 is a horizontal section taken along the line VI—VI in FIGURE 7 through a melting tank in a third embodiment of the invention, such embodiment forcing the cooled glass which has come back into the charging zone to rise near the surface of the central area of such zone before moving off again towards the working zone, FIGURE 6a shows a modification of the embodiment in FIG. 6, FIGURE 7 is a vertical section similar to FIGURE 5 and taken along the line VII—VII in FIGURE 6, and FIGURE 8 is a cross-section similar to FIGURE 5 through a melting tank in a fourth embodiment of the invention.

In FIGURES 1 to 8 like references denote like elements.

Referring to FIGURES 1 and 2, a glass melting tank has at a charging zone at one end thereof pockets 2 where the batch is charged into the tank and from which the batch floats on the glass bath 3 while the portion of such bath near the surface 4 thereof moves forward in the direction of arrow X, towards a working zone at the opposite end of the tank where the glass is removed for working at places 5.

The charging pockets 2 can be considered to be part of the melting zone 6 in which the batch melts and becomes homogenized before reaching a refining zone 7 in which the batch is refined. On leaving the refining zone the hot glass ribbon moves into the working zone 8 where it cools before arriving at the removing places 5.

Near the entrance to the working zone 8 a floater 9 extending from one side wall 10 to the other 11 prevents the impurities floating on the glass bath from reaching the removing places 5. The cooled glass in contact with the tank bottom 12 in the working zone moves along the tank bottom in the direction of the melting zone.

According to the invention, the current of cooled glass is deflected from the direct path which it would follow along the central area of the tank, by the fact that such current encounters in such area a submerged wall 13 which extends transversely to the side walls 10, 11 and is spaced from such side walls. The submerged wall therefore defines a passage 24 with each side wall through which must pass the cooled glass which is being returned to the charging zone. The cooled glass which is returning towards the melting zone 6 is divided into two currents which are constrained to move towards the side wall through passages 24.

The cooled glass continues to move on the tank bottom parallel to the side walls because the cooled glass is guided by means of submerged wings 14, 15 which extend from the submerged wall 13 in a longitudinal direction towards the charging zone. The submerged wings extend from the tank bottom 12 into the melting zone and therefore form with the adjacent side walls 10, 11 and the tank bottom 12 channels of passages which guide the cooled glass towards the charging zone. In this embodiment the submerged wings 14, 15 advantageously extend into the melting zone but it is possible for them to end in the area of the refining zone adjoining the melting zone.

In FIGURE 1 continuous lines 16 show in diagrammatical form the path followed by the surface glass on which the melt residues are floating. These impurities can easily be removed by means of skimming through sight holes 17 near the floater 9. The chain lines 18 show in diagrammatical form the path followed near the tank bottom 12 by the cooled glass.

In the tank shown in FIGURES 3 to 5, the submerged wall 13 extends at the upper portion thereof to the side walls 10, 11 to form an opening 19 at the bottom of the tank between the side walls 10, 11 and the ends of the submerged wall 13 for the passage of the cooled glass. The refining zone 7 is joined to the working zone by a narrowed portion 20. The cooled glass leaving the working zone through such narrowed portion is deflected towards the openings 19 by the submerged wall 13. In the tank shown in FIGURES 1 and 2 and the tank shown in FIGURES 3 to 5, when the cooled glass has passed the wings 14, 15 when flowing towards the charging zone it can spread out over the whole distance between the side walls 10, 11. Some of such glass can therefore be entrained and carried towards the working zone again while it moves up between wings 14, 15 thereby undesirably cooling to a certain extent the surface glass moving towards the working zone in the central area of the tank. This disadvantage can be obviated by means of supplementary submerged wall 21, as shown in FIGURES 6 and 7. The submerged wall 21 extends from the tank bottom 12 parallel with the submerged wall 13. The cooled glass which spreads out between the wall 21 and the charging zone is forced to rise above the wall 21 before moving towards the working zone again. Such glass will therefore become heated in the heating zone before passing above the glass trapped in the quadrilateral formed by the walls 13, 14, 15 and 21.

In the quadrilateral the glass is at a temperature much higher than that of the side channels in which the return currents are circulating, and therefore the transverse component of the surface current of the central area is higher than was the case with the two previously described tanks.

The submerged wall 21 (FIGURE 4) joins the ends of the wings 14, 15 which are nearest the charging zone. A similar protective effect can be produced if a submerged wall 21' is provided which joins the wings 14, 15 at locations spaced from the ends thereof in a direction nearer to the submerged wall 13. A submerged wall 21' is shown in this configuration in FIGURE 6a.

Referring to FIGURE 8, openings 19' allowing the passage of the return currents of cooled glass towards the charging zone are formed in a transverse wall 13' which is not completely submerged as in the previously described embodiments. The central portion 23 of the wall 13' is above the glass level 4, while the two side portions 22 of the wall 13' are submerged to allow the passage of the glass towards the working zone.

Clearly, the invention is not limited to the embodiments which have been described and many modifications may be made in the shape, arrangement and constitution of the elements thereof without departing from the scope of the invention as defined in the appended claims.

What we claim is:

1. In a glass melting tank having side walls and a bottom, and being provided from one end to the other, with a charging zone, a melting zone, a refining zone and a cooled working zone in which the glass cools before reaching a removal region therein, an improvement comprising floater means near the entrance of the working zone for arresting residues on the molten glass, at least one side wall having a sight hole for skimming off the floating residues arrested by said floater means, and a transverse wall rising from the bottom of the tank and leaving at least one passage allowing the upper layers of refined glass to flow from the refining zone into the working zone, said transverse wall being spaced from at least one side wall near the bottom of the tank in order to allow the return towards the melting zone, along the bottom, of cooled glass which has not been removed at the removal region.

2. In a tank as claimed in claim 1 wherein said improvement further comprises a submerged wing on the tank bottom extending rearwardly from said transverse wall at a location where the latter is spaced from a side wall.

3. In a tank as claimed in claim 2, wherein said submerged wing extends rearwardly as far as the melting zone.

4. In a tank as claimed in claim 2, wherein said transverse wall includes an upper portion extending from one side wall to the other and a lower portion proximate the bottom of the tank having an opening adjacent at least one side wall.

5. In a tank as claimed in claim 2, wherein said transverse wall is spaced from the two side walls for its entire height.

6. In a tank as claimed in claim 4, wherein said upper portion of said transverse wall includes a central part extending to a height above the level of the molten glass and and a submerged portion above said opening in said lower portion.

7. In a tank as claimed in claim 2 comprising a second submerged wing extending in spaced relation from the first said wing, and a second transverse wall spaced from the first wall and extending from said bottom of the tank between the submerged wings at the rear portion of the latter.

8. A method for deflecting towards at least one of the side walls of a glass melting tank, silica-rich melt residues which cover a central zone of a glass bath in the tank which flows from a charging zone to a refining zone and to a cooled working zone, said method comprising returning cooler glass from the working zone, in countercurrent flow with the bath, towards the charging zone, diverting the flow of said cooler glass to pass in a submerged zone adjacent at least one side wall of the tank, to effect local cooling of the upper surface of the bath and cause the central portion of the bath to follow a deflected path towards the one said side wall of the tank whereby impurities on the upper surface of the bath in said central portion may be removed from the tank.

9. A method as claimed in claim 8 wherein said residues are deflected towards opposite side walls of the tank by dividing the counterflowing cooler glass into two streams respectively diverted to flow in a zone adjacent a corresponding side wall.

10. A method as claimed in claim 8 comprising guiding and restricting the counterflowing cooler glass to flow along said one wall of the tank in the return of the cooler glass to the charging zone.

References Cited by the Examiner
UNITED STATES PATENTS

| | | | |
|---|---|---|---|
| 1,916,668 | 7/1933 | Howard | 65—134 |
| 2,384,073 | 9/1945 | Campbell | 65—343 |
| 3,208,841 | 9/1965 | Burch | 65—335 |
| 3,265,485 | 8/1966 | Carney et al. | 65—178 |

DONALL H. SYLVESTER, *Primary Examiner.*

G. R. MYERS, *Assistant Examiner.*